March 17, 1925.
R. P. JACKSON
AUTOMATIC CONTROL SYSTEM
Filed May 10, 1922
1,529,792
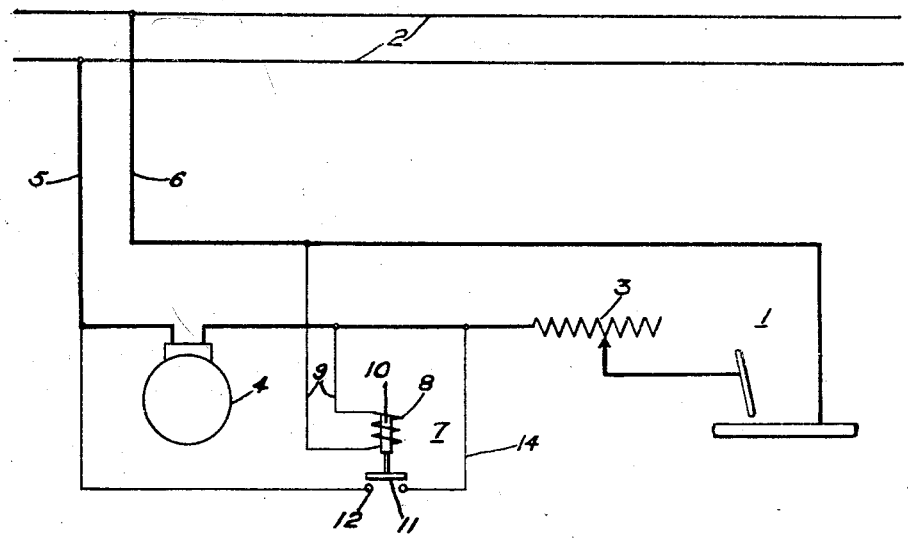
WITNESSES:
C.N.Cochran
F.H.Miller
INVENTOR
Ray P. Jackson
BY
Chesley G. Carr
ATTORNEY Patented Mar. 17, 1925.

1,529,792

UNITED STATES PATENT OFFICE.

RAY P. JACKSON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

AUTOMATIC CONTROL SYSTEM.

Application filed May 10, 1922. Serial No. 559,802.

*To all whom it may concern:*

Be it known that I, RAY P. JACKSON, a citizen of the United States, and a resident of Edgewood Park, in the county of Allegheny and State of Pennsylvania, have invented a new and useful Improvement in Automatic Control Systems, of which the following is a specification.

My invention relates to automatic control systems and particularly to means whereby an instrument is caused to register only under certain conditions.

One object of my invention is to provide a system, of the above indicated character, including an instrument that shall register a load only above a certain voltage.

Another object of my invention is to provide a means for more equitably measuring the current consumption of a low power-factor load by compensating for low voltages of the supply circuit.

Heretofore, power companies have been reluctant to supply low power-factor loads, such as those employed in electric welding, because the established method of charging for power has been on the kilowatt-hour basis. Since the power-station costs are proportional to the volt-ampere-hour output, the kilowatt-hour consumption is not a true measure of the expense required to supply a low-power-factor load.

Further, an ampere-hour meter in a low-power-factor circuit imposes an undue penalty on the consumer when the supply voltage falls below a predetermined value by reason of excessive current consumption.

To overcome the above mentioned conditions, I propose a device by the use of which a system of measuring the load is obtained which is more equitable to the power company and the consumer.

In practicing my invention, I provide an ampere-hour meter that is connected to register the load current under all normal voltage conditions and to penalize the consumer in accordance with the power factor of the load but which is rendered inoperative when the supply voltage falls below a predetermined value, to thus compensate for the excessive current used on low voltages.

The single figure of the accompanying drawing is a diagrammatic view of a device and the circuits therefor embodying my invention.

A load circuit 1 is connected across an alternating-current supply circuit 2 through a series-connected resistor 3, a series-connected ampere-hour meter 4 and conductors 5 and 6.

A low-voltage circuit-closing device 7 comprises a coil 8 that is connected, by conductors 9, across the conductors 5 and 6, a core member 10 and a bridging switch contact member 11 connected to the core member.

The switch member 11 is held in normally open-circuit relation to stationary contact members 12 disposed in a circuit conductor 14 that is connected to the conductor 5 in shunt relation to the meter 4.

In operation and under normal supply-voltage conditions, the device 7 holds the contact member 11 out of engagement with the stationary contact members 12 to thus permit all of the load current to pass through the meter 4. Thus, under normal-voltage conditions, the consumer is penalized in accordance with the power factor of the load 1.

Should the voltage on the supply circuit 2 fall below a predetermined value, the load 1 would ordinarily consume an excessive amount of current. However, with the arrangement shown, when the voltage reaches such predetermined value, the contact member 11 closes the circuit 14 to render the meter 4 inoperative until the supply voltage again attains its normal value.

The arrangement shown compensates both the supply company and the consumer for the losses incident to low-power-factor loads in a very simple and inexpensive manner.

While I have shown and described a particular form of my invention, changes may be effected therein without departing from the spirit and scope thereof, as set forth in the appended claims.

I claim as my invention:

1. The combination with a supply circuit, a meter and a load circuit normally connected to the supply circuit through the meter, of means for automatically shunting the meter from the circuit when the supply-circuit voltage is reduced to a predetermined value.

2. The combination with a supply circuit, a meter and a load circuit normally connected to the supply circuit through the meter, of switching means for automatically shunting the meter from the circuit when the supply-circuit voltage is reduced to a predetermined value.

3. The combination with a supply circuit, of a meter and a load circuit normally connected to the supply circuit through the meter, and means for automatically shunting the meter from the circuit when the supply-circuit voltage changes in one direction from a predetermined value.

4. The combination with an alternating-current supply circuit, of an ampere-hour meter and a load circuit normally connected to the supply circuit through the meter, and a voltage-responsive circuit-interrupting device connected to automatically shunt the meter from the circuit when the supply-circuit voltage is reduced to a predetermined value.

5. The combination with a supply circuit, a load circuit having a series load thereon and a meter connected in series in the load circuit, of a normally open circuit disposed in shunt relation to the meter and an under-voltage circuit-closing device for closing the shunt circuit.

In testimony whereof, I have hereunto subscribed my name this 8th day of May, 1922.

RAY P. JACKSON.